(12) United States Patent
Beckmann et al.

(10) Patent No.: US 8,521,986 B2
(45) Date of Patent: Aug. 27, 2013

(54) ALLOCATING STORAGE MEMORY BASED ON FUTURE FILE SIZE OR USE ESTIMATES

(75) Inventors: Charles E. Beckmann, Altadena, CA (US); Richard Cadruvi, Simi Valley, CA (US); Gary Quan, Glendale, CA (US); Craig Jensen, Clearwater, FL (US)

(73) Assignee: Condusiv Technologies Corporation, Burbank, CA (US)

( * ) Notice: Subject to any disclaimer, the term of this patent is extended or adjusted under 35 U.S.C. 154(b) by 203 days.

(21) Appl. No.: 12/854,804

(22) Filed: Aug. 11, 2010

(65) Prior Publication Data

US 2011/0107053 A1    May 5, 2011

Related U.S. Application Data

(60) Provisional application No. 61/256,299, filed on Oct. 29, 2009.

(51) Int. Cl.
*G06F 12/02*    (2006.01)

(52) U.S. Cl.
USPC ........... 711/171; 711/163; 711/170; 711/173; 714/720

(58) Field of Classification Search
USPC .................. 711/171, 163, 170, 173; 714/120
See application file for complete search history.

(56) References Cited

U.S. PATENT DOCUMENTS

| | | | |
|---|---|---|---|
| 6,088,764 A * | 7/2000 | Shyam et al. | 711/112 |
| 2003/0131278 A1* | 7/2003 | Fujibayashi | 714/6 |
| 2004/0059758 A1* | 3/2004 | Faiman et al. | 707/205 |
| 2007/0150492 A1* | 6/2007 | Shitomi | 707/100 |
| 2009/0235041 A1 | 9/2009 | Harris | |

FOREIGN PATENT DOCUMENTS

WO    WO 2007/081638    7/2007

OTHER PUBLICATIONS

"Notification of Transmittal of the International Search Report and the Written Opinion of the International Searching Authority, or the Declaration" received in PCT Application No. PCT/US10/54856 dated Jan. 28, 2011 (9 pages).

Current Claims of PCT International Application No. PCT/US10/54856 dated Jan. 2011 (3 pages).

* cited by examiner

*Primary Examiner* — Jae Yu
(74) *Attorney, Agent, or Firm* — Christie, Parker & Hale, LLP

(57) ABSTRACT

A method for allocating storage memory space is provided. The method involves receiving a request for storage memory allocation for a file of a current size; estimating a future size of the file, different than the current size of the file, based at least on a particular attribute associated with the file; and causing allocation of storage memory space for storage of the file based on the future size of the file.

12 Claims, 4 Drawing Sheets

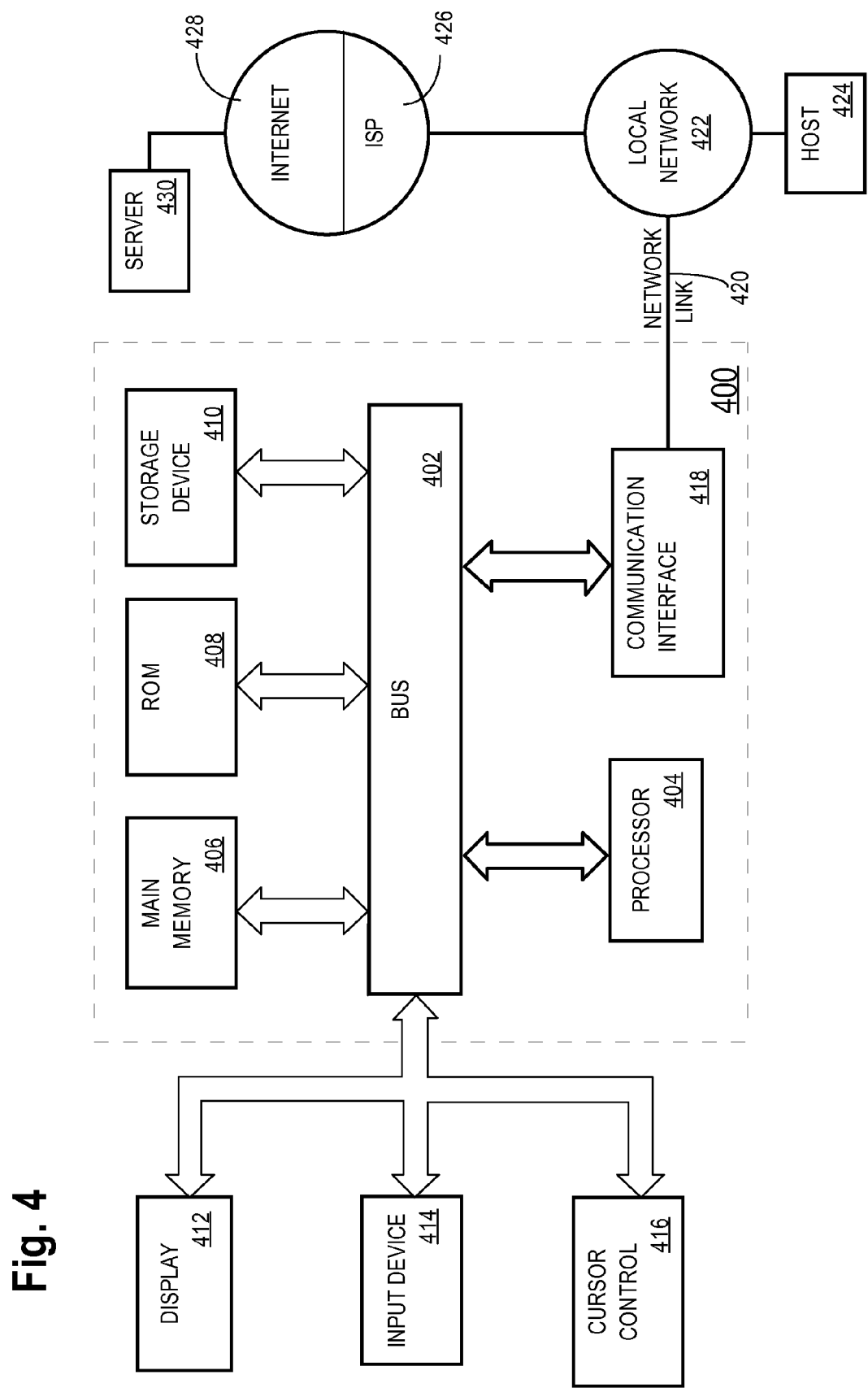

ALLOCATING STORAGE MEMORY BASED ON FUTURE FILE SIZE OR USE ESTIMATES

CLAIM OF PRIORITY

This application claims priority under 35 U.S.C. §119 to the U.S. Provisional Application Ser. No. 61/256,299 filed on Oct. 29, 2009, the entire contents of which are hereby incorporated by reference.

FIELD OF THE INVENTION

The present invention relates to allocating or reserving storage memory. More specifically, the invention relates to allocating or reserving storage memory for a file based on an estimated future size of the file.

BACKGROUND

Data fragmentation or free space fragmentation in a computing system results in inefficiencies that generally reduce storage capacity and performance.

Fragmentation may occur when already stored files are modified and there is insufficient consecutive storage memory space to store the modified file at the same storage memory address. In this case, the modified file may be fragmented and a portion of the modified file may be stored at a different position. Alternatively, the entire modified file may have to be moved to a different storage memory address with sufficient consecutive storage memory space to store the modified file resulting in input/output (I/O) inefficiencies.

Inefficiencies may also result from storing related files separately, even though the files themselves may not be fragmented. For example, in a rotating platter drive, if two files that are generally accessed together are located in two different storage memory spaces, then reading and/or writing to the two files may always involve a delay in moving the read/write head from one storage memory space to the other storage memory space.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 shows a block diagram of a computer system that may be used in implementing one or more embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

In one or more embodiments, a method for allocating storage memory for one file is described. The method involves estimating a future size of a file and allocating storage memory space for storage of the file based on the future size of the file, instead of the current size of the file. The future size of the file is estimated based on patterns associated with files having one or more attributes of the file being stored.

In one or more embodiment, a method for allocating storage memory for multiple files is described. The method involves receiving a storage memory allocation request for a first file and predicting a future allocation request for a second file related to the first file. Based on the prediction of the future allocation request for the second file, storage memory space is allocated for storage of both the first file and the second related file. Consecutive storage memory space may be allocated for the first file and the second related file.

Although specific components are recited herein as performing the method steps, in other embodiments agents or mechanisms acting on behalf of the specified components may perform the method steps. Further, although the invention is discussed with respect to components on a single system, the invention may be implemented with components distributed over multiple systems.

Embodiments of the invention also include any system that includes the means for performing the method steps described herein. Embodiments of the invention also include a computer readable medium with instructions, which when executed, cause the method steps described herein to be performed.

System Architecture

Figure 1:
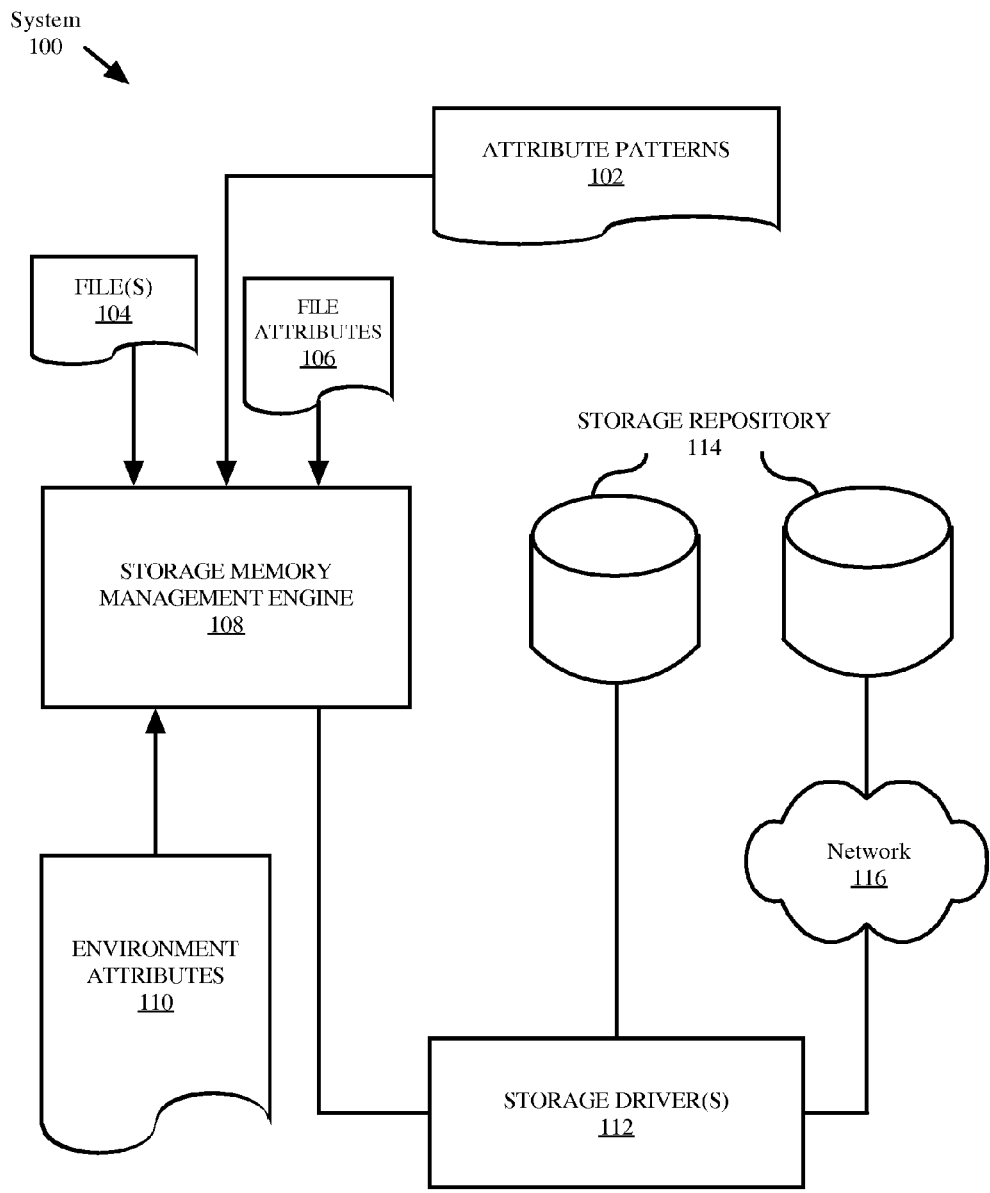
FIG. 1 shows an exemplary system for allocating storage memory in accordance with one or more embodiments.

Although a specific system architecture is described herein, other embodiments of the invention are applicable to any architecture that can be used for file positioning. FIG. 1 shows an exemplary system (100) for allocating storage memory in accordance with one or more embodiments. As shown in FIG. 1, the system (100) includes a storage memory management engine (108), a storage driver(s) (112), and one or more storage repositories (114). The system (100) may also include other components which, although not shown, may be used for implementation of one or more embodiments. Each of these components may be located on the same device or may be located on separate devices coupled by a network (e.g., Internet, Intranet, Extranet, Local Area Network (LAN), Wide Area Network (WAN), etc.), with wired and/or wireless segments or on separate devices coupled in other means. In one or more embodiments of the invention, the system (100) is implemented using a client-server topology. In addition, the system may be accessible from other machines using one or more interfaces. In one or more embodiments of the invention, the system may be accessible over a network connection, such as the Internet, by one or more users. Information and/or services provided by the system may also be stored and accessed over the network connection.

File Attributes and Environment Attributes

The file(s) (104) generally represents any data that is to be stored in the storage repository (114). The file(s) (104) may be a system file, an application file, a data file, and/or any other file or collection of data that is logically considered a single collection of information. The file(s) (104) may represent a file on a virtual system received for storage on virtual storage memory space (corresponding to physical storage memory).

In an embodiment, the file(s) (104) is associated with one or more attributes. Attributes associated with a file may include file attributes (106), environment attributes (110), etc. File attributes (106) generally represent any characteristic of the file. For example, a file attribute (106) of a file (104) may be the file type. Examples of files types include executable files, data files, image files, video files, text files, system files, configuration files, developer files, etc. or any other possible file types. The file type associated with a file may be the particular type such as a bitmap image file or a JPEG image file, or the file type associated with a file may be a category of the file such as an image category (which includes both bitmap image files and JPEG image files).

File attributes (106) may also include any classification or categorization of the file. For example, a file used exclusively during a boot up process may be categorized as a boot-up file. In an embodiment, a file attribute changes after creation of the file. For example, a user associated with a file may be changed or content within the file may be changed.

Another example of a file attribute (106) includes prior use of the file. An attribute related to a prior use of a file may indicate a process that owns/controls the file, an application that requests storage of the file or requests access to the file, an access frequency associated with the file, a number of processes that have shared the file or are currently sharing the file, a user associated with the file, content or information contained in the file, an age of the file, a number/size of other files associated with the file, etc.

In an embodiment, the file(s) (104) is associated with attributes that are environment attributes (110). Environment attributes (110) generally represent any characteristics associated with an environment in which the file is stored, accessed, modified, executed, etc. An example of an environment attribute (110) includes the available storage memory space in the storage repository (114) in which the file (104) is stored or to be stored. Another example of an environment attribute (110) may be an operating system managing the file. Environment attributes (110) may also include a geographical region in the world in which the computer system accessing the file is located. Environment attributes (110) may include a use context. For example, an environment attribute (110) may indicate whether the file is being accessed, modified, etc. by a student for an educational purpose or by an employee for a professional purpose. Environment attributes (110) may include the number of users accessing the computing system that is managing the file (104) or the number of users with permission to modify the file (104). Environment attributes (110) may include any other characteristics of an environment associated with the file (104).

Attribute Patterns

In an embodiment, files (104) are grouped together based on one or more common attributes (e.g., file attributes (106), environment attributes (110), etc.). Statistics associated with a group of files (104), having a particular attribute, are used to identify attribute patterns (102) associated with the attribute. Attribute patterns (102) generally include any data derived from the statistics. Attribute patterns (102) may include data determined by performing computations based on the statistics, detecting patterns in the statistics, etc. All the statistics associated with a group of files (104) or a portion of the statistics associated with the group of files (104) may be used to detect patterns. For example, outliers or data points that are substantially different from a set of data may be discarded before detecting patterns in the statistics.

In an embodiment, attribute patterns (102) may refer to size based statistics. A size of each file in a set of files having a particular attribute is monitored. The size of a particular file is monitored with respect to time or with respect to the number of accesses to the file. For example, a size of each file in a group of files is monitored at creation and after two write accesses have been made for a file. Thereafter, for each file in the set of files, an actual change in file size is determined by subtracting the file size at creation from the file size after two write accesses. A percentage change in file size for each file is determined by dividing the change in file size by the file size at creation. The average of the actual change across the set of files or the average of the percentage change across the set of files is determined. An attribute pattern (102) corresponding to the set of files having that particular attribute may include data that indicates the average change. For example, the attribute pattern (102) may include data indicating an expected increase in size by x bytes or by y percentage, based on the average across the set of corresponding files, from the time the file was created. Instead of average across the set of corresponding files, a mode or other statistical calculation may be used to determine an attribute pattern (102).

In an embodiment, the attribute pattern (102) based on file sizes includes data indicating size ranges. For example, the smallest monitored increase in file size for any file in a set of files may be 10 percent while the largest monitored increase in file size for any file in a set of files may be 25 percent. In this example, the range of the increase is 10 percent to 25 percent. The attribute pattern (102) of expected increase includes data defining a range of 10 percent to 25 percent from the time of creation (or from another specified time).

In an embodiment, the attribute pattern (102) includes data indicating a maximum file size of a set of files with a particular attribute. The attribute pattern (102) may also include data indicating the average time period for a file to reach a maximum file size after creation of the file. The attribute pattern (102) may also include data indicating the average number of modifications until a maximum file size of each file is reached.

In an embodiment, the attribute pattern (102) refers to storage memory allocation request patterns for a set of files (104) with a particular attribute. For example, if a first storage memory allocation request for storage of a file owned by a particular process is generally followed by a second storage memory allocation request for storage of a related file, then an attribute pattern (102) may include data indicating that the particular process generally submits a second storage memory allocation request within a specified time of a first storage memory allocation request. A second memory storage allocation request may refer to any memory storage allocation request subsequent to the first memory storage allocation request. An attribute pattern (102) may refer to a pattern of the total storage memory space used by the files that are owned by a particular process. The attribute pattern (102) may include data indicating initial storage memory usage by a process or application and subsequent or maximum storage memory usage by the process or application. In another example, the attribute patterns (102) may refer to actions generally performed on a group of files with the particular attribute. For example, the attribute pattern may include data indicating that "create, access, modify, modify, and access actions" are generally performed on particular boot-up files in a system executing a Unix operating system or owned by a particular process in Application X. Each action may also be associated with corresponding changes in file size.

In an embodiment, the attribute pattern (102) may refer to a file access sequence for a set of files. For example, if files B, C, R, G, and E are repeatedly accessed in that particular order or at approximately the same time, the attribute pattern (102) may include data indicating the file access sequence. In this example, the common attribute for files B, C, R, G, and E may be a common owner process or simply that the files are all part of the same access sequence. Although a particular attribute (e.g., file type) may be referred to in the examples herein, embodiments of the invention are applicable to any attributes associated with the file. Accordingly, attribute patterns (102) may be identified for any attribute (e.g., file attributes (106), environment attributes (110), etc.) associated with a file.

In an embodiment, multiple attribute patterns (102) may be associated with a particular attribute and/or multiple attributes may be associated with particular attribute pattern (102). For example, a set of files (104) owned by a particular process is monitored to identify shared statistics. The shared statistics indicate (1) that on average the set of files increase by 40% from initial creation and (2) that the files first created by the particular process are deleted within a short period of time and files later created by the particular process are never deleted. A first attribute pattern (102) for the set of files (104) may include data indicating that on average a file increases 40% in size from initial creation. A second attribute pattern (102) for the same set of files may include data indicating that files created by the particular process within x minutes from the initialization of the particular process are temporary files and files created by the process after x minutes are files with a long duration. The second attribute pattern (102) may also be applicable to a second set of files created by another process (e.g., a second set of files having with another attribute).

The Storage Repository

The storage repository (114) generally represents one or more storage devices with storage locations where files may be stored. Portions of the storage repository (114) may be connected directly to the system (100), may be connected over a network (116), or other suitable interfaces. The storage repository (114) may include any type of storage devices known in the art. For example, the storage repository (114) may include traditional rotating platter drives, solid state drives (SSDs), a hybrid combination of the traditional rotating platter drives and SSDs, a separate storage system like a Storage Area Network (SAN), a Network Attached Storage (NAS) device or a RAM-based device acting as storage but consisting of random access memory (RAM). Furthermore, each storage device within the storage repository (114) may include different types of storage locations. For example, an SSD within the storage repository (114) may include different cells, such as, single level cells (SLCs), multi-level cells (MLCs), or a combination thereof. Thus, the storage locations within the storage repository (114) that are available for storage to the system (100) may be on a single storage device or multiple storage device with varying configurations across different storage devices or even within a single storage device.

The Storage Driver

In an embodiment, the storage driver(s) (112) stores and retrieves files from the storage repository (114) based on a set of instructions received directly or indirectly from the storage memory management engine (108). For example, the storage memory management engine (108) provides a file (104) and a storage location for storing the file to a file system, which thereafter forwards the instructions on to the storage driver(s) (112). The instructions received by the storage(s) driver (112) simply specify the storage device, in which case the storage driver(s) (112) determines where within the storage device to store the file. The instructions may also specify a region of storage device, a specific storage location on a storage device, a storage repository or a location in a storage repository.

In an embodiment, the storage driver (112) is configured to obtain an estimate (or prediction) of a future size of a file (104). For example, the storage driver (112) may calculate the estimate of the future size of the file (104), or obtain the estimate of the future size of the file (104) from the storage memory management engine (108), a file system, etc. The storage driver (112) may determine how much storage space to allocate based on the future size of the file or obtain information from the storage memory management engine (108), the file system, etc. that indicates how much storage space to allocate based on the future size of the file.

Storage Memory Management Engine

In an embodiment, the storage memory management engine (108) within the system (100) generally represents any software and/or hardware that may be configured to identify the attribute patterns (102). The storage memory management engine (108) may be implemented logically between an application/operation system and a file system or between the file system and the storage driver (112). The storage memory management engine (108) may also be implemented as a component of the file system. The storage memory management engine (108) may be an application running on one or more servers, and in some embodiments could be a peer-to-peer application, or resident upon a single computing system (e.g., a personal computer, a hand-held device, a kiosk, a computer onboard a vehicle, or any other system with storage devices).

In an embodiment, the storage memory management engine (108) is configured to monitor one or more files (104) with a particular attribute (e.g., file attribute (106), environment attribute (110), etc.) or a particular combination of attributes to identify an attribute pattern (102) associated with the particular attribute or the particular combination of attributes. The files (104) may be monitored by the storage memory management engine (108) by checking the files (104) periodically for actual sizes and recording the actual sizes as a function of time. The files (104) may be monitored by recording the file size after each modification to the file (104). In an embodiment, the file size may be monitored as a function of the number of times the file (104) has been accessed. For example, data may be captured that indicates the size of the file (104) in relation to the access number of the file (104) (e.g., $5^{th}$ access, $9^{th}$ access, $120^{th}$ access, etc.). In an embodiment, in addition to or instead of the actual file size, changes in file size may be monitored and recorded. The changes in file size may include a percentage change or absolute change in file size. The change in file size may be monitored and recorded in comparison to the previous recorded file size or the original file size when a file (104) was first created.

In an embodiment, the storage memory management engine (108) identifies an attribute pattern (102) for an attribute based on the files (104) associated with the attribute. For example, a common pattern is detected across log files used by a particular application in a boot up process. The common detected pattern is that each log file is created and thereafter modified during the boot up process which results in doubling the file size of the log file after initial creation. In this example, the common attribute of the log files is the association with the particular application. The storage memory management engine (108) identifies the attribute pattern (102), associated with the attribute, which includes data indicating that log files used by the particular application in the boot up process double in size after creation during the boot process. A pattern may be identified as the attribute pattern (102), in response to identifying the pattern for a particular threshold number or percentage of log files used by the particular process during the boot up process.

In an embodiment, the storage memory management engine (108) includes logic for causing allocation of storage memory space for storage of a file (104) based on a future size of the file (104), as described below with reference to FIG. 2. In an embodiment, the storage memory management engine (108), in response to receiving a storage memory allocation request for a first file, allocates or reserves storage memory space for storing a second file, as described below with reference to FIG. 3. Although specific components may be referred to herein as performing particular actions, embodiments of the invention include any component described herein (or not described) performing any of the actions described herein.

Allocating Storage Memory Space Based on a Future Size of a File

Figure 2:
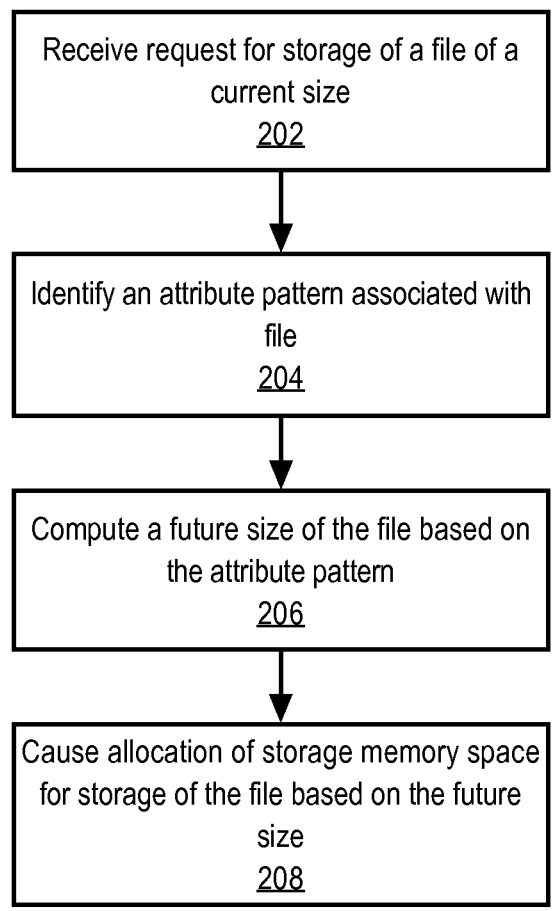
FIGS. 2 and 3 show flow diagrams for causing allocating of storage memory space in accordance with one or more embodiments.

FIG. 2 shows a flow chart for causing allocation of storage memory space in accordance with one or more embodiments of the invention. In one or more embodiments, one or more of the steps described below may be omitted, repeated, and/or performed in a different order. Accordingly, the specific arrangement of steps shown in FIG. 2 should not be construed as limiting the scope of the invention.

In an embodiment, a request for storage of a file of a current size is received (Step 202). The request for storage of the file may be for the initial storage of the file when the file is first created by an application or an operating system. The request for storage of the file may be for storing a modification of a previously stored file. In an embodiment, the current size corresponds to the size of the file that is to be stored. When a request for storage of a modified file is received, the current size corresponds to the size of the modified file being stored.

In an embodiment, an attribute pattern associated with the file is identified (Step 204). The attribute pattern may be identified by first identifying one or more attributes associated with the file. For example, the type of the file, the process/application owning the file, the environment in which the file is being stored, or any of the other attributes described herein may be identified. Thereafter, the attribute patterns associated with the one or more attributes of the file are identified. For example, a table matching attribute patterns with attributes may be queried to identify the attribute patterns. In an embodiment, the attribute patterns may not be known prior to receiving the request for storage of the file. In this case, once the attribute associated with the file being stored is identified, the other files associated the same attribute are identified. Thereafter, the other files may be analyzed to determine attribute patterns. In an embodiment, the attribute pattern may include the maximum size of each file of the set of other files or a mean or mode of the maximum size of each file of the set of other files.

In an embodiment, a future size of the file is computed (estimated) based on the attribute pattern (Step 206). The future size of the file may correspond to an estimate of the size of the file after a specified number of modifications, after a specified period of time, a maximum size the file may grow to, etc. For example, the future size of the file associated with a particular attribute may be computed based on a maximum size of each file of a set of other files associated with the same particular attribute. A future size (e.g., future maximum size) of the file being stored may be estimated based on the mean or mode of the maximum monitored sizes of the other files. The future maximum size of the file may be estimated based on the largest of the maximum monitored sizes of the other files. Similarly, an estimate of the size of the file being stored after a specified number of modifications may be based on the monitored sizes of the other files after a specified number of modifications to each of the other files. An estimate of the size of the file being stored after a specified period of time may be based on the monitored sizes of the other files after a period of time after creation of each of the other files.

In an embodiment, computing the future size further includes increasing the computed value by a particular amount to account for variances. For example, the future maximum size may be computed by first averaging the maximum size of the other files to obtain a first value and thereafter increasing the first value by a particular percentage or particular value. The increase in the first value may be based on a standard deviation of the set of maximum values corresponding to the other files. For example, if the maximum values of the other files are within a small range (e.g., small standard deviation), then a small percentage increase from the first computed value can be used to compute the estimated maximum size of the file being stored. In contrast, if the maximum values of the other files are within a wide range (e.g., large standard deviation), then a large percentage increase from the first computed value may be used to compute the estimated maximum size of the file being stored. The increase percentage or increase value in the computation of the future size of the file being stored may be directly related to the standard deviation of the sizes of the other files associated with the same attribute. In an embodiment, buffer to allow for variances may be directly dependent on available storage memory space. For example, the greater the available storage memory space, the larger the buffer may be used. Conversely, the less the available storage memory space, the smaller the buffer may be used. Although the maximum size is used for specific examples, embodiments of the invention are applicable to other sizes of the files (e.g., size after specified number of modifications, size after specified period of time since creation).

In an embodiment, an attribute pattern including an access type sequence is used to predict a future size. For example, if an attribute pattern comprises only of reads after an initial write, the future size estimate may be the same as a current size estimate. If the attribute pattern includes the initial write followed by a sequence of reads and writes where the maximum size through all the modifications is double the original size, then the future size estimate of the file being stored may be double the original size. In an embodiment, the modification to the file being stored may be identified within an access sequence. For example, a modification of a file may be recognized as the third modification of a sequence of five modifications in the attribute pattern. Based on the position in the sequence of modifications, a future size may be determined. In the above example, the future size estimate may be based on the larger of the two file sizes expected after the fourth and fifth modifications subsequent to the third modification.

In an embodiment, storage memory space for storage of the file is caused to be allocated based on a computed future size (Step 208). Contiguous storage memory space larger than or equal to the computed future size may be allocated for storage of the file. In an embodiment, a temporary file of the computed future size may be generated and stored in a contiguous storage memory space, and thereafter overwritten with the actual file to be stored in storage memory. In an embodiment, two files (e.g., the actual file to be stored and a temporary space filler file) may be stored in the contiguous storage memory space. Thereafter, as space is needed for modifications of the actual file, the temporary space filler file may be reduced in size or deleted. In an embodiment, the additional storage memory space unused for storage of the file but needed based on the future estimate may be reserved by specific instructions to a file system or storage driver. For example, metadata may indicate that particular storage memory space is to be reserved for future increases in a file size of a specified file. Any other suitable implementation which allows for allocating or reserving storage memory space for storage of the file based on a future size of the file(s) (estimate or prediction) that is different than a current size of the file may be used. In an embodiment, the additional space that is allocated or reserved based on an estimated future size of the file may be held conditionally. For example, if the storage repository is low on storage memory, the reserved or unnecessarily allocated storage memory space may be garbage collected for use by the file system. In an embodiment, over-allocated memory space may be released for new memory allocation. The release of the over-allocated memory may be based on a relative location of the over-allocated memory to a file being extended or to a file being associated with a new file that needs to be stored. In an embodiment, the release of existing over-allocated memory space is based on a new file being able to fit in the released memory space or an extension of a previously stored file being able to fit in the released memory space.

Figure 3:
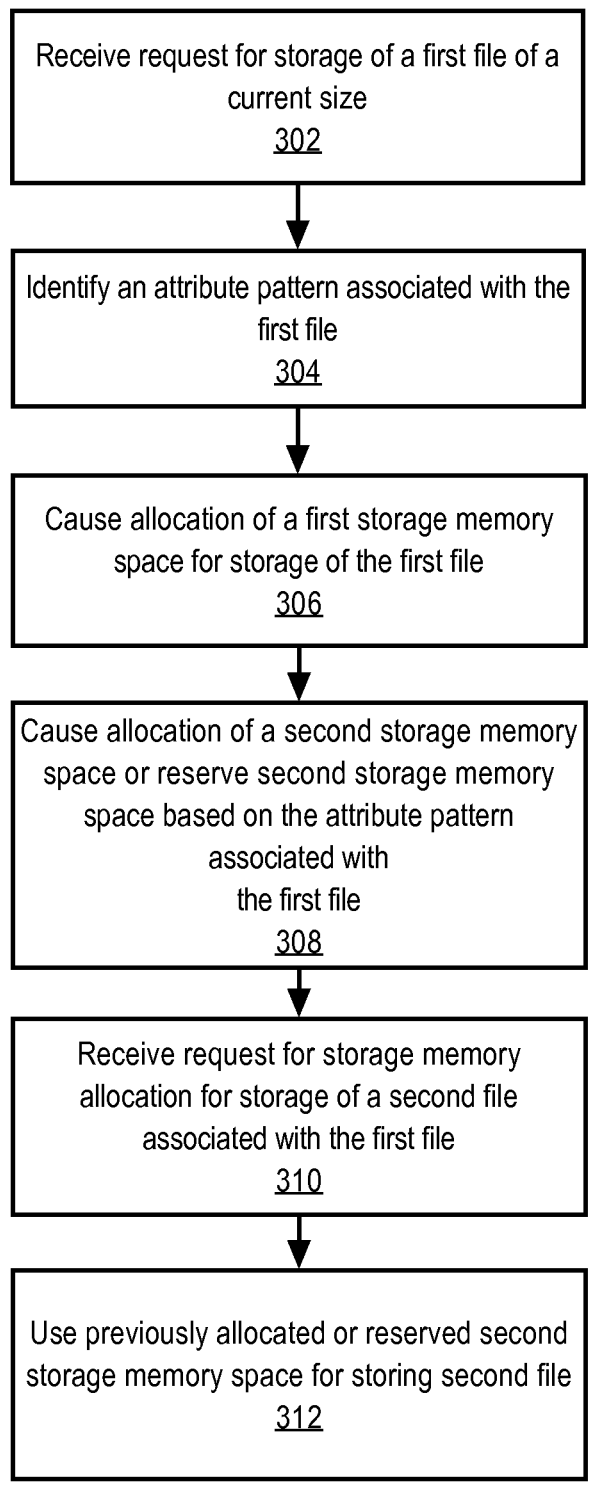

Allocating Storage Memory Space Before Receiving a Request to Store Data in the Storage Memory Space FIG. 3 shows a flow chart for causing allocation of storage memory space in accordance with one or more embodiments of the invention. In one or more embodiments, one or more of the steps described below may be omitted, repeated, and/or performed in a different order. Accordingly, the specific arrangement of steps shown in FIG. 3 should not be construed as limiting the scope of the invention.

In an embodiment, a request for storage of a first file of a current size is received (Step 302) and an attribute pattern associated with the first file is identified (Step 304). Step 302 and Step 304 are similar to Step 202 and Step 204 described above, respectively. In an embodiment, a first storage memory space is allocated for storage of the first file (Step 306). The allocation of the first storage memory space may be based on the current size of the first file or based on a future size of the first file, as described with reference to Step 208 above.

In an embodiment, a second storage memory space is allocated or reserved based on the attribute pattern associated with the first file (Step 308). The second storage memory space may be allocated or reserved before receiving a command to store data in the second storage memory space. The second storage memory space may be allocated or reserved in response to receiving the request for allocation of the first storage memory space for storage of the first file. The second storage memory space may be adjacent to the first storage memory space, e.g., the first storage memory space and the second storage memory space may form a contiguous storage memory space. In an embodiment, the second storage memory space may be allocated or reserved for storing a modified version of the first file (e.g., when the first file is modified to a larger size in the future).

In an embodiment, the second storage memory space is allocated or reserved for storage of at least one other file related to the first file. For example, the attribute pattern may indicate that an allocation request for the first file is generally followed by an allocation request for a second file related to the first file. The second file may be a file that is associated with the same attribute as the first file. For example, the second file may be owned by the same process as the first file. The attribute pattern may indicate that a second file will be created that is generally accessed immediately subsequent to the first file or in approximately the same time frame as the first file. Storing of the second file in the second storage memory space adjacent to the first storage memory space may result in faster I/O speed (e.g., due to minimal movement by a rotating platter head). Accordingly, the second storage memory space may be allocated or reserved specifically for the second file, before receiving a request to store the second file in the second storage memory space. The second storage memory space may be allocated or reserved specifically for the second file before the second file is created. In an embodiment, the second file accessed in the same time frame as the first file may be previously created and stored elsewhere. In this case, the stored second file which is related to the first file may be moved to the second storage memory space adjacent to the first storage memory space in response to the attribute pattern indicating that the first file and the second file are accessed in approximately the same time frame. Reserving the second storage memory space may include storing a temporary file in the second storage memory space to be deleted or overwritten when the second file is stored to the second storage memory space. Reserving the second storage memory space may include instructing the file system or storage driver (e.g., through metadata stored in association with the storage memory space) that the storage memory space is reserved for the second file. Reserving the second storage memory space may include implementing a table corresponding to storage memory spaces where reserved storage memory spaces have a specific indication (e.g., a flag). In an embodiment, reserving the second storage memory space may involve storing a temporary file or a place holder file in the second storage memory space. The temporary file or place holder file may then be deleted or overwritten when the second storage memory space is to be used for storing the second file related to the previously stored first file.

In an embodiment, a request for allocating storage memory for the storage of the second file, associated with the first file, is received (Step 310). The second file may be identified based on the attribute pattern. For example, an attribute pattern may identify a process that requests two storage memory allocations for two related files that are generally accessed within the same time frame. After a first storage memory space has been allocated for the first file in response to the first request, and a second storage memory space has been allocated or reserved for a future second file, requests from the process may be monitored for additional storage memory allocation requests. When the second request for storage memory allocation is received from the monitored process, the second storage memory space is used to store data associated with the second request (i.e., the second file that is related to the first file) (Step 312). In an embodiment, the request for storing the second file may include metadata that indicates that the second file is related to the first file and is to be stored with the first file.

Hardware Overview

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red file communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the file on the telephone line and use an infra-red transmitter to convert the file to an infra-red signal. An infra-red detector can receive the file carried in the infra-red signal and appropriate circuitry can place the file on bus 402. Bus 402 carries the file to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way file communication coupling to a network link 420 that is connected to a local network 422. For example, communication interface 418 may be a card or a modem to provide a file communication connection to a corresponding type of telephone line in the form of integrated services digital network (ISDN) or digital subscriber line (DSL). As another example, communication interface 418 may be a local area network (LAN) card to provide a file communication connection to a compatible LAN. Wireless links may also be implemented. In any such implementation, communication interface 418 sends and receives electrical, electromagnetic or optical signals that carry digital file streams representing various types of information.

Network link 420 typically provides file communication through one or more networks to other file devices. For example, network link 420 may provide a connection through local network 422 to a host computer 424 or to file equipment operated by an Internet Service Provider (ISP) 426. ISP 426 in turn provides file communication services through the world wide packet file communication network now commonly referred to as the "Internet" 428. Local network 422 and Internet 428 both use electrical, electromagnetic or optical signals that carry digital file streams. The signals through the various networks and the signals on network link 420 and through communication interface 418, which carry the digital file to and from computer system 400, are exemplary forms of carrier waves transporting the information.

Computer system 400 can send messages and receive file, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In an embodiment, the techniques or methods described herein may be performed by any computing device. Examples of computing devices include, but are not limited to, computer systems, desktops, laptops, mobile devices, servers, kiosks, tablets, cellular phones, game consoles, or any other machine which includes hardware used for performing at least a portion of the methods described herein.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
   receiving a first request for storage memory allocation for a file;
   in response to receiving the first request, causing allocation of a first storage memory space for storage of the file; and
   causing allocation of a second storage memory space or reserving the second storage memory space based at least on an attribute that is, at the time the first request is received, associated with the file,
   wherein the attribute is
   a pattern associated with one or more other files that have a characteristic in common with the file, and
   wherein the method is performed by one or more computing devices.

2. The method of claim 1, wherein causing allocation of the second storage memory space or reserving the second storage memory space is in response to receiving the first request.

3. The method as recited in claim 1, wherein the second storage memory space is allocated or reserved prior to receiving a second request which results in storing data in the second storage memory space.

4. The method of claim 1, further comprising:
   monitoring storage memory allocations to detect a storage memory allocation pattern for each file, of a plurality of files, with the particular attribute,
   wherein detecting the storage memory allocation pattern for each file comprises:
   monitoring storage memory allocation for storage of that file with the particular attribute; and
   monitoring storage memory allocation for storage of another file related to that file with the particular attribute, within a specified time interval, and
   wherein the second storage memory space is allocated or reserved, based on the storage memory allocation pattern, for a second file related to the file prior to receiving a second request for storage memory allocation for the second file.

5. The method as recited in claim 1, wherein causing allocation of the first storage memory space and causing allocation of the second storage memory space or reserving the second storage memory space comprises: identifying consecutive storage memory space comprising the first storage memory space and the second storage memory space.

6. The method of claim 1, wherein causing allocation of a second storage memory space or reserving the second storage memory space is for a second file that is different than the file.

7. One or more computer readable storage media storing instructions which, when executed by one or more processors, causes performance of steps comprising:
   receiving a first request for storage memory allocation for a file;
   in response to receiving the first request, causing allocation of a first storage memory space for storage of the file; and
   causing allocation of a second storage memory space or reserving the second storage memory space based at least on an attribute that is, at the time the first request is received, associated with the file,
   wherein the particular attribute is a pattern associated with one or more other files that have a characteristic in common with the file.

8. The one or more computer readable media of claim 7, wherein causing allocation of the second storage memory space or reserving the second storage memory space is in response to receiving the first request.

9. The one or more computer readable media as recited in claim 7, wherein the second storage memory space is allocated or reserved prior to receiving a second request which results in storing data in the second storage memory space.

10. The computer readable storage medium of claim 7, wherein the instructions, when executed by the one or more processors, further cause:
    monitoring storage memory allocations to detect a storage memory allocation pattern for each file, of a plurality of files, with the particular attribute,
    wherein detecting the storage memory allocation pattern for each file comprises the following steps:
    monitoring storage memory allocation for storage of that file with the particular attribute; and
    monitoring storage memory allocation for storage of another file related to that file with the particular attribute, within a specified time interval, and
    wherein the second storage memory space is allocated or reserved, based on the storage memory allocation pattern, for a second file related to the first file prior to receiving a second request for storage memory allocation for the second file.

11. The one or more computer readable media as recited in claim 7, wherein causing allocation of the first storage memory space and causing allocation of the second storage memory space or reserving the second storage memory space comprises:
    identifying consecutive storage memory space comprising the first storage memory space and the second storage memory space.

12. The one or more computer-readable media of claim 7, wherein causing allocation of a second storage memory space or reserving the second storage memory space is for a second file that is different than the file.

* * * * *